(12) United States Patent
Dooley et al.

(10) Patent No.: US 6,390,729 B1
(45) Date of Patent: May 21, 2002

(54) ENGINEERED ENVIRONMENTAL STRUCTURE

(75) Inventors: James H. Dooley, Federal Way; Justin T. Maschhoff, Tacoma, both of WA (US)

(73) Assignee: Forest Concepts LLC, Federal Way, WA (US)

( * ) Notice: Subject to any disclaimer, the term of this patent is extended or adjusted under 35 U.S.C. 154(b) by 0 days.

(21) Appl. No.: 09/735,382

(22) Filed: Dec. 12, 2000

(51) Int. Cl.[7] ................................................ E02B 3/06
(52) U.S. Cl. ............................ 405/29; 405/15; 405/35
(58) Field of Search ............................. 405/15, 16, 17, 405/19, 21, 22, 23, 25, 26, 27, 28, 29, 35; 441/47–54

(56) References Cited

U.S. PATENT DOCUMENTS

| | | | | |
|---|---|---|---|---|
| 381,494 A | * | 4/1888 | Durell et al. | 441/48 |
| 1,287,902 A | * | 12/1918 | Cyr | 405/23 |
| 3,991,576 A | * | 11/1976 | Tazaki et al. | 405/21 |
| 4,098,086 A | * | 7/1978 | Desty et al. | 405/26 |
| 5,272,829 A | | 12/1993 | Roberts et al. | 43/4 |
| 5,823,710 A | | 10/1998 | Dooley | 405/29 |

* cited by examiner

*Primary Examiner*—Heather Shackelford
*Assistant Examiner*—Frederick L. Lagman
(74) *Attorney, Agent, or Firm*—Keith D. Gehr

(57) ABSTRACT

An engineered wood structure is shown that can be placed in an aquatic or other environment. It is particularly useful in environmental enhancement efforts as a resting place for various avian and aquatic species. The structure is preferably made from small logs. A number of logs are placed side-by-side to form a deck surface. A single log is spaced apart from and generally centered below the deck logs. A pair of spaced apart struts depend from the lower surface of each deck log and are connected into the keel log to form a unitary structure.

22 Claims, 4 Drawing Sheets

ENGINEERED ENVIRONMENTAL STRUCTURE

The present invention is concerned with structures useful for environmental enhancement and with the method of their manufacture. The structures are advantageously made from small, low value logs such as thinnings or tree tops.

BACKGROUND OF THE INVENTION

Organic debris is generally recognized as important for maintaining the biotic and abiotic functions of streams, lakes, and ponds. In streams, large woody debris has a major influence on channel form and on sediment transport and deposit patterns. The quantity of large woody debris is highly correlated with the number of pools that are critical as fish habitat. In addition to providing favorable water conditions for aquatic life, this in stream wood also provides shade and refuge from predators.

An earlier patent of one of the present inventors, U.S. Pat. No. 5,823,710, describes a substitute for natural large woody debris that can be readily manufactured and transported to the site where it will be used. This product has proved very effective for managing stream habitat and hydrology. It is formed as a hollow, generally cylindrical or frustroconical structure formed from an even number of small logs held together by wood struts mortised into the logs. The central portion may be ballasted with rocks to increase the weight and stability against movement by high water.

While the above noted product has been excellent for streams, lakes and ponds present their own unique needs for woody debris. In particular, structures suitable as perches for birds and basking surfaces for amphibians and turtles are essential to the general environmental health. As one example, the western pond turtle (*Clemmys marmorata*) is presently a threatened species. This once abundant turtle has been in serious decline through a combination of factors including habitat loss and predation by non-native species. These turtles require a significant basking time in sunlight in order to regulate body temperature. Adequate basking time also appears to be linked to reproductive success of females. The turtles prefer an environment with large amounts of emergent logs or boulders in areas of maximum sunlight availability. Underwater woody debris close to basking sites provides hiding places from predators. Crevices under sunken logs are especially preferred. The present invention can fill this need for birds, turtles, and other aquatic species since it can be readily assembled and optimally placed, both on the surface and under water.

SUMMARY OF THE INVENTION

The present invention is an engineered wood structure that can be placed in an aquatic environment to fill the need for surface resting places for various aquatic and avian species. It can also be used to provide underwater refugia when anchored below the surface. The structure can be readily assembled on site, if necessary, using a number of small logs that can often be obtained locally. A number of the logs are placed side-by-side to form a deck surface. A single log is spaced apart from and centered below the deck logs to serve in the manner of a keel for the structure. The deck logs and the keel log are connected by struts. At least two spaced apart struts depend from the lower surface of each of the deck logs and are connected into the keel log.

While the invention is primarily directed to the use of small logs or other woody material, it should be considered more broadly so as to include other materials such as pipe or tubes of metal or plastic materials. When the term "logs" used it should be considered to encompass these alternative elongated materials.

The upper surface of the side-by-side deck logs may be configured to describe a plane, the arc of a circle, the major curvature of an ellipse, or other suitable geometric configuration. The major surface of an ellipse would be defined as that in which a line drawn through the transverse center point of the deck logs and the keel log would lie along the minor radius of the ellipse.

The deck logs may lie against and be touching each other or they may be spaced apart, depending on the particular need that the structure will fill.

It should be noted that the terms "upper and lower surfaces" of the deck logs and "deck and keel portions" are relative. They refer to the configuration in which the structure would most usually be used and serve for convenience in description. However, there may be occasions when the structure would be inverted or otherwise positioned in use and during assembly.

A preferred method of joining the deck and keel logs is by the use of wood struts mortised into the logs. Where materials other than wood are used other methods of fastening might be more suitable, such as welding or sleeved fittings. The ends of the deck logs may be evenly arranged or somewhat displaced from each other.

The easiest construction to make is that in which the upper surface of the deck logs defines the arc of a circle since the struts are then all of equal length. However, in the case of a floating structure this presents the minimum width of deck area. This is a problem noted with the structure of U.S. Pat. No. 5,823,710. Other configurations including planar and elliptical (in cross section) deck surfaces which give a greater exposed area may be preferred.

The number of logs in the deck portion is not critical and may vary between as few as two or as many as 12. Normally between about three to eight deck logs are preferred. Length and diameter of these logs is not critical. Lengths will normally be between in the range from about 2–4 m (~6–13 feet) and diameters between 10–20 cm (4–8 inches). There may be either an even or odd number of deck logs. Keel logs will fall within the same size range. Length and diameter of the struts is likewise not critical. Typically the struts will be somewhat smaller in diameter than the deck or keel logs. About 6–10 cm (~2½–4 inches) in diameter would be typical. Lengths will usually be in the range of about 30–60 cm (1–2 feet).

The structure need not be used only in the configuration of a floating raft. One end may be anchored under water so that the other end is elevated above the surface for some distance. This arrangement is particularly useful since it presents an favorable perch for birds. The angle made with the water surface may be very low or, in the extreme, the long dimention of the structure may be normal to the surface. Alternatively, the entire structure may be held below water. The structure may be used in a manner where it is entirely surrounded by water or it may be adjacent a bank of the lake, pond, or stream where it is deployed.

It is an object of the present invention to provide an engineered wood structure that can be used in various manners for environmental enhancement.

It is another object to provide a structure for use in streams, lakes, and ponds that provides a basking surface or refuge for avian and aquatic fauna.

It is a further object to provide a structure of the above type that may be readily assembled from small logs or other woody material that is environmentally friendly and natural in appearance.

These and many other objects will become readily apparent when reading the following detailed description taken in conjunction with the drawings.

DETAILED DESCRIPTION OF THE PREFERRED EMBODIMENTS

Figure 1:
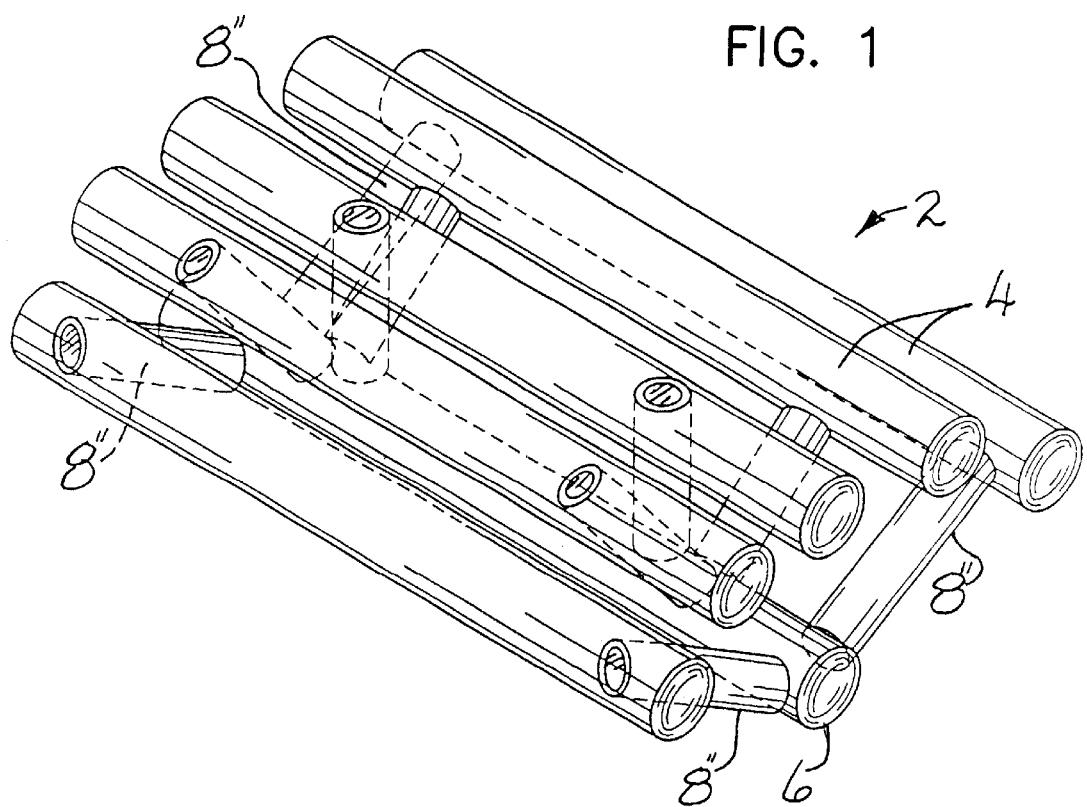
FIG. 1 is a perspective view of one configuration of the structure of the present invention.

The construction of the invention may be readily understood by reference to the drawings. FIG. 1 is a general view 2 showing one configuration of the structure. Deck logs 4 (five of them in this version) are united to keel log 6 by pairs of spaced apart struts 8" depending from the lower part of the deck logs. In this version the deck logs are shown spaced apart somewhat. This spaced-apart version might be chosen when the structure is used submerged; e.g., as a reef for enhancing fish habitat or as a raft when it is desirable for an occupant to be able to dive for cover as soon as possible. A somewhat wider deck with the same size logs may also be attained by forming spaces between the logs.

Figure 2:
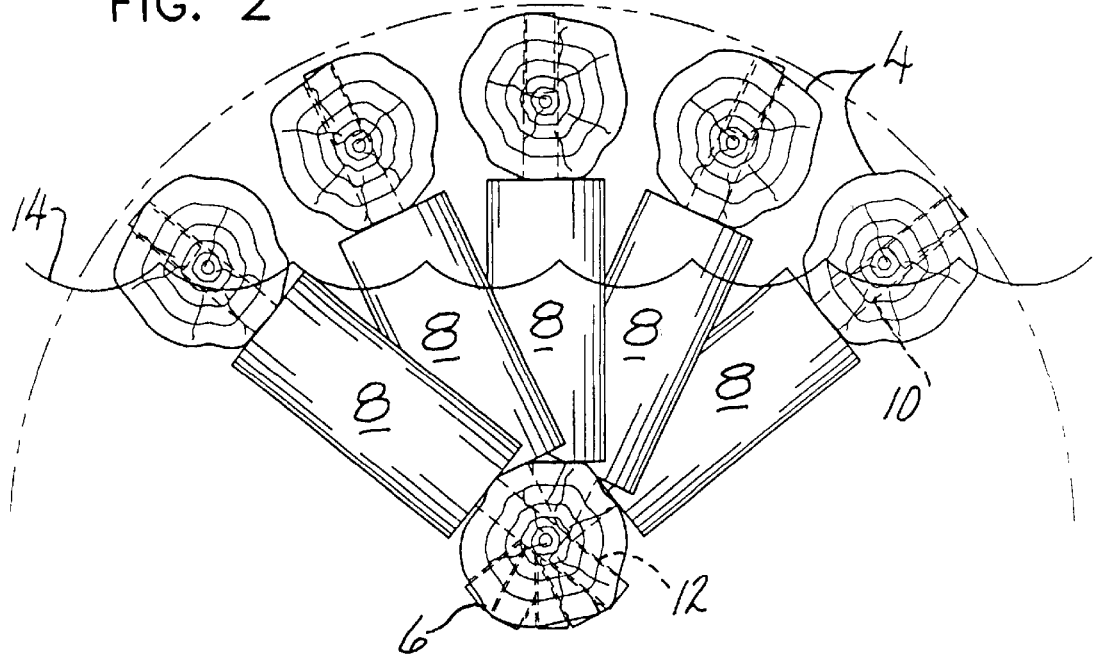
FIGS. 2–4 are end elevations of other configurations of the structure.

FIG. 2 is an end view of another version of the raft in which the upper surface of the deck logs describe the arc of a circle. This is the simplest version to construct since the struts 8 are of equal length. The struts are turned to form tenons 10, 12 at each end. The tenons unite the struts into the deck and keel logs. This illustration shows the use of the structure as a raft floating on water 14.

Figure 3:
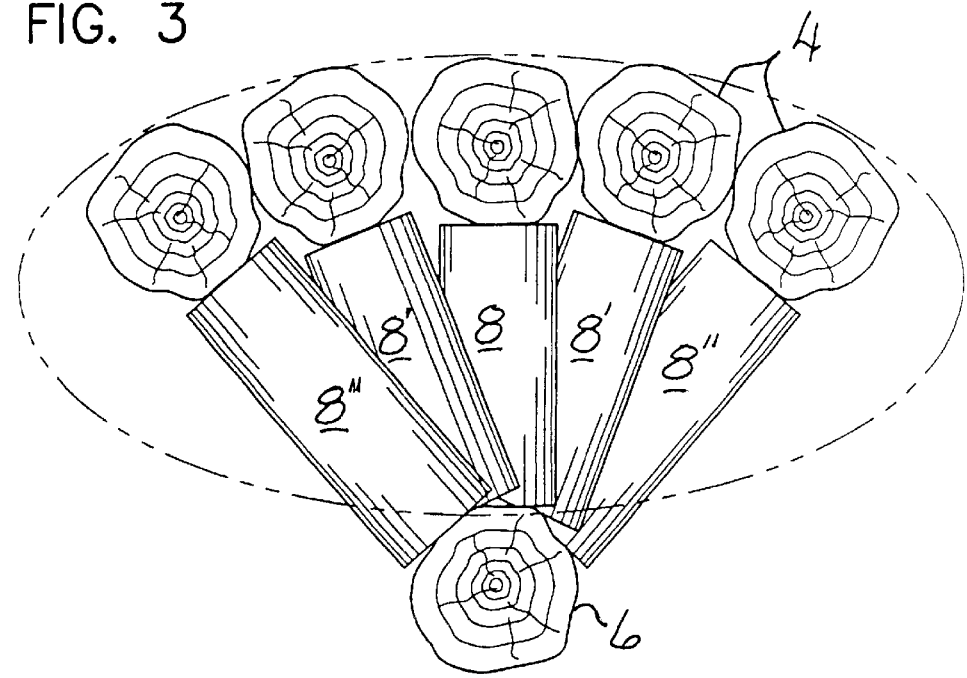

FIG. 3 Is similar to that of FIG. 2 but shows a variation designed to give a somewhat flatter and wider deck area with the same number and size logs. In this case the struts 8, 8', and 8" are successively longer as they progress from the center deck log to the outer deck logs. The upper surface of the deck logs describe the major curve of an ellipse. The surface profile of the structure shown in FIG. 3 is similar to that of FIG. 1. As shown in FIG. 3, the deck logs are in located so as to touch each other and form a more solid surface.

Figure 4:
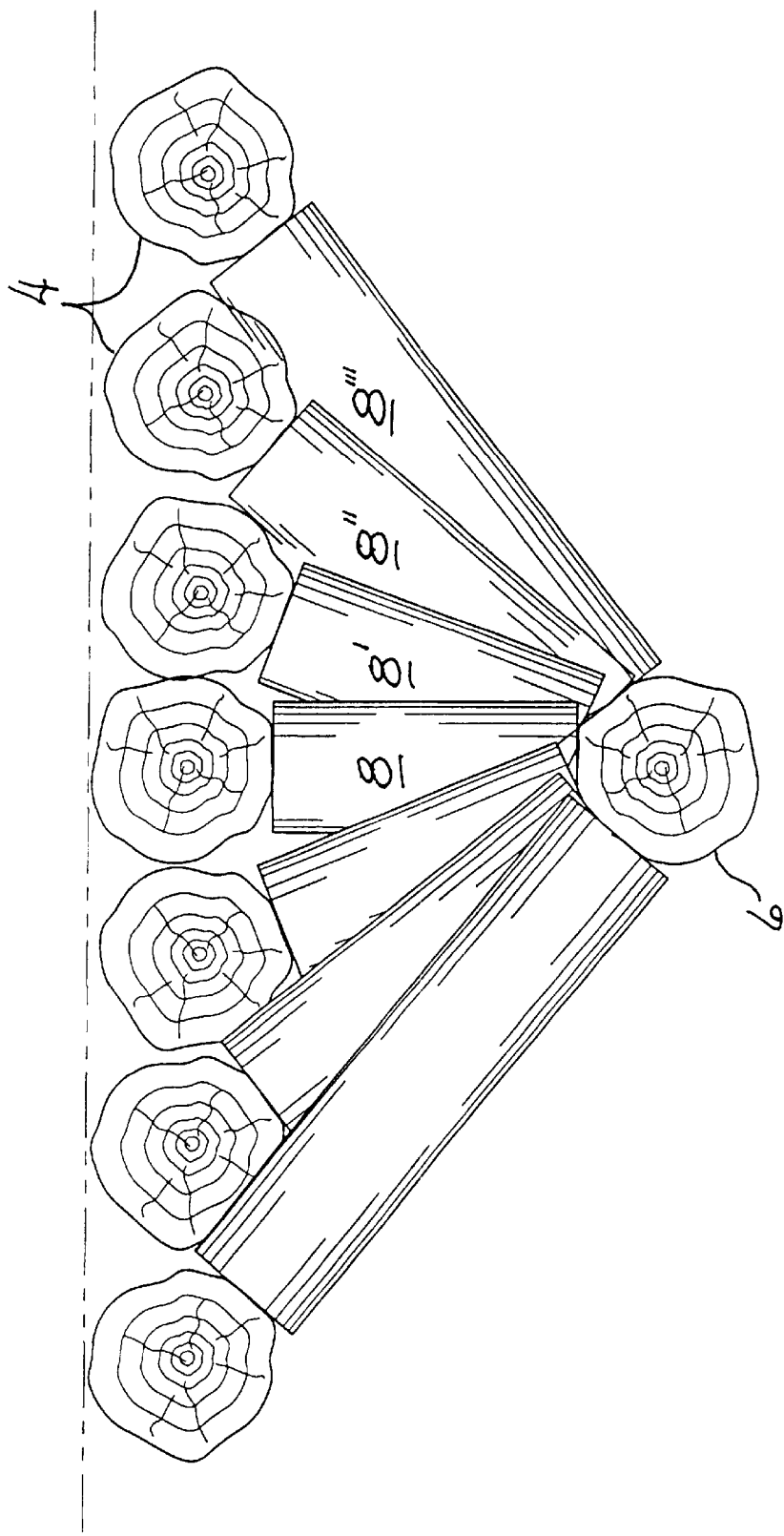

FIG. 4 is similar to FIGS. 2 and 3 but shows the deck logs arranged so as to have a generally planar upper surface. As before, the struts 8, 8', 8" and 8''' are progressively longer from the center to the outside of the structure It should be noted that in the preferred configurations the struts shown in FIGS. 2–4 would probably be considerably smaller in diameter relative to the deck and keel logs than those illustrated in the drawings.

Figure 5:
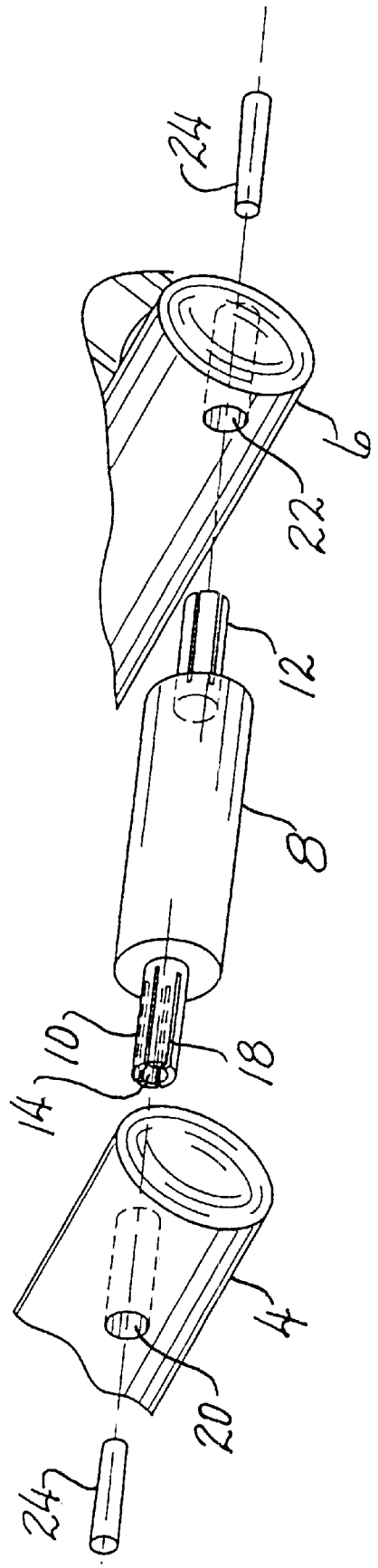
FIG. 5 is an exploded view showing a preferred manner in which the elements of the structure are joined.

A preferred method of joining the deck and keel members is shown in FIG. 5. The ends of strut 8 are terminated in tenons 10, 12. These tenoned ends are preferably hollowed, as at 14, and have several cuts 18 to allow expansion after insertion. The tenons 10, 12 are inserted into mortises 20, 22 formed respectively in deck member 4 and keel 6. Tapered plugs 24 serving as wedges are then driven in to the holes 14 in the ends of the mortises to permanently expand them for solid retention.

It will be evident to those skilled in the art that many variations not exemplified here could be made in construction of the structure. It is the intention of the inventors that these should be included within the scope of the invention if encompassed by any of the following claims.

What is claimed is:

1. An engineered wood structure that comprises:
    a plurality of side by side logs functioning as a deck structure, said logs having upper and lower surfaces;
    a single log spaced apart from and generally centered below the deck logs, said single log serving as a keel structure; and
    at least two spaced apart struts depending from the lower surface of each of the deck logs, the struts connecting each deck log individually to the keel log to form a unitary structure, the deck logs not being directly connected to one another.

2. The wood structure of claim 1 in which the upper surfaces of the side by side deck logs lie upon an arc defined by a circle.

3. The wood structure of claim 1 in which the upper surfaces of the side by side deck logs lie along a line defined by an ellipse, a straight line drawn through the keel and transverse center point of the deck logs lying essentially along the minor radius of the ellipse.

4. The wood structure of claim 1 in which the upper surfaces of the side by side deck logs describe a planar surface.

5. The wood structure of claim 1 in which adjacent deck logs lie against each other.

6. The wood structure of claim 1 in which adjacent deck logs are spaced apart from each other.

7. The wood structure of claim 1 in which the deck logs and keel log are joined together by wood struts mortised into the logs.

8. The wood structure of claim 1 which has at least three deck logs.

9. An engineered structure that comprises:
    a plurality of side by side elongated members functioning as a deck structure, said elongated members having upper and lower surfaces;
    a single elongated member spaced apart from and generally centered below the deck members, said single member serving as a keel structure; and
    at least two spaced apart struts depending from the lower surface of each deck member, the struts connecting each deck member individually to the keel member to form a unitary structure, the deck members not being directly connected to one another.

10. The structure of claim 9 in which the upper surfaces of the side by side deck members lie upon an arc defined by a circle.

11. The structure of claim 9 in which the upper surfaces of the side by side deck members lie along a line defined by an ellipse, a straight line drawn through the keel and transverse center point of the deck members lying essentially along the minor radius of the ellipse.

12. The structure of claim 9 in which the upper surfaces of the side by side deck members describe a planar surface.

13. The structure of claim 9 in which adjacent deck members lie against each other.

14. The structure of claim 9 in which adjacent deck members are spaced apart from each other.

15. The structure of claim 9 which has at least three deck members.

16. A method of making an engineered wood structure which comprises:
    providing a plurality of side by side logs functioning as a deck structure, said logs having upper and lower surfaces;
    further providing a single log spaced apart from and generally centered below the deck logs, the single log serving as a keel structure; and joining the deck logs to the keel log with at least two spaced apart struts depending from the lower surface of each deck log, each deck log being connected individually to the keel log to form a unitary structure, the deck logs not being directly connected to one another.

17. The method of claim 16 which includes placing the upper surfaces of the side by side deck logs so that they lie upon an arc defined by a circle.

18. The method of claim 16 which includes placing the upper surfaces of the side by side deck logs so that they lie along a line defined by an ellipse, a straight line drawn through the keel and transverse center point of the deck logs lying essentially along the minor radius of the ellipse.

19. The method of claim 16 which includes placing the upper surfaces of the side by side deck logs so that they describe a planar surface.

20. The method of claim 16 in which adjacent deck logs lie against each other.

21. The method of claim 16 in which adjacent deck logs are spaced apart from each other.

22. The method of claim 16 which includes uniting the deck logs and keel log together by mortising wood struts into the logs.

* * * * *